(12) United States Patent
Patton

(10) Patent No.: US 6,822,951 B1
(45) Date of Patent: Nov. 23, 2004

(54) METHOD AND APPARATUS FOR ROUTING MESSAGES IN A WIRELESS NETWORK

(75) Inventor: Charles M. Patton, Eugene, OR (US)

(73) Assignee: Texas Instruments Incorporated, Dallas, TX (US)

( * ) Notice: Subject to any disclaimer, the term of this patent is extended or adjusted under 35 U.S.C. 154(b) by 651 days.

(21) Appl. No.: 09/704,089

(22) Filed: Nov. 1, 2000

Related U.S. Application Data

(60) Provisional application No. 60/163,899, filed on Nov. 5, 1999.

(51) Int. Cl.$^7$ .......................... G01R 31/08; H04L 12/54; H04L 12/28
(52) U.S. Cl. .......................... 370/338; 370/401; 370/428
(58) Field of Search ................................. 370/229, 310, 370/351, 350, 328, 338, 428, 401, 254, 400; 455/445, 412.1, 466; 375/222, 356

(56) References Cited

U.S. PATENT DOCUMENTS

| | | | |
|---|---|---|---|
| 5,473,612 A | * | 12/1995 | Dehner et al. .............. 370/514 |
| 5,682,382 A | | 10/1997 | Shepard |
| 5,926,101 A | * | 7/1999 | Dasgupta ................ 340/825.02 |
| 6,201,811 B1 | * | 3/2001 | Larsson et al. ........... 370/310.1 |
| 6,553,020 B1 | * | 4/2003 | Hughes et al. ............... 370/347 |

* cited by examiner

Primary Examiner—Duc Ho
(74) Attorney, Agent, or Firm—J. Dennis Moore; W. James Brady, III; Frederick J. Telecky, Jr.

(57) ABSTRACT

A method and apparatus for routing messages in a wireless network. Transmissions from all devices are synchronized. Each device is equipped with a routing unit that checks incoming messages for integrity, discards "corrupt" messages, compares non-corrupt messages to the last transmitted message, and applies a set of rules to determine when and what the device should next receive or transmit. The synchronized transmissions and integrity checking process detect true collisions, which occur when multiple transmitters have attempted to send different messages to the same receiver. The comparing process ensures that messages are transmitted only if not previously transmitted, thereby avoiding loop problems.

14 Claims, 7 Drawing Sheets

METHOD AND APPARATUS FOR ROUTING MESSAGES IN A WIRELESS NETWORK

This application claims priority under 35 USC § 119(e)(1) of provisional application No. 60/163,899 filed Nov. 5, 1999.

TECHNICAL FIELD OF THE INVENTION

This invention relates to wireless networks, and more particularly to a routing method and apparatus for avoiding unnecessary retransmissions, such as those caused by loops, in a link-determined topology.

BACKGROUND OF THE INVENTION

Wireless networks include a vast variety of network configurations, all characterized by the transmission of data through the air rather than through a cable. Wireless networks may include LANs (local area networks) as well as WANs (wide area networks) or the upcoming versions of LANs known as PANs (personal area networks).

Much of today's wireless networking technology is directed to radio frequency (RF) signals, but microwave and infrared signals may also be used. Wireless communications can be passed with either analog or digital signaling.

"Packet radio" has been in use for many years, with packet radio networks comprised of conventional radios, each in communication with a computer and a modem. Messages are carried in packets and the radios forward each packet separately.

More recently, the transmission of packet data by radio has been accomplished with all kinds of radio-equipped computing equipment. Wireless network access is used by equipment such as 2-way data devices (messaging devices and personal digital assistants), data capable phones, and laptops and palmtops. Although each device may be mobile or stationary, by convention, they are often referred to as "stations".

In a multi-hop network, each station participates in forwarding messages to other stations, thereby extending the communication range of each station.

For wireless packet networks, routing protocols designed for wired networks are not generally satisfactory. Various methods may be used to determine the best path between two wireless devices. One approach to routing is source routing, where the sender of a message includes the routing with the message. Another approach is referred to as link-state or link-determined routing, in which the best path is determined by a router that executes some sort of routing algorithm.

An example of a link-determined routing method, first applied for packet radio networks, is known as Radio Shortest Path First (RSPF) routing. Roughly described, the RSPF protocol is designed for use by Internet layer routing nodes in a packet radio network using the Internet Protocol (IP). It is a way to make IP work with packet radio.

The result of link-determined routing is a link topology, which may have loops and other problematic structures. The problems associated with such structures are manifested in situations such as contention control, when messages are to be retransmitted. If messages are simply retransmitted from device to device, loops can cause messages to be cycled endlessly through the network, causing problems. This is especially true when the communication range of the communicating devices is short relative to the maximum pair-wise distance between devices.

SUMMARY OF THE INVENTION

One aspect of the invention is a method of routing messages in a wireless communications network having a number of wireless communications devices. At least some of the devices having computation resources, which permit the device to interpret and respond to messages. Transmissions from each device are synchronized, such that all transmissions occur simultaneously. At each receiving device, a routing unit performs the following operations: storing each last transmitted message; checking incoming messages for integrity, such that any message comprised of different transmissions is designated as a corrupt message; discarding any corrupt messages; delivering each non-corrupt incoming message to the computation resources; receiving a potential outgoing message from the computation resources, comparing each potential outgoing message with the last transmitted message; using a rules engine to determine whether the potential outgoing message should be transmitted.

It may be that the computation resources do not modify the message, such that the potential outgoing message is the same as the incoming message. The rules engine is programmed to apply the following rules: the device may transmit only in response to receiving a transmission; the device may only receive after transmitting; the device repeats a received transmission unless it is configured to respond to the transmission; and the results of the comparing step are used to prevent the device from repeating a transmission.

In accordance with the invention, each device in the network performs routing tasks at the link level. A designated root device performs additional routing tasks. Specifically, transmissions are synchronized among all devices. Each device follows a set of rules that result in alternating send-listen cycles, permit collisions to be detected, and avoid unnecessary retransmissions.

As a result of the synchronized device-based routing control, collisions are allowed to occur. This is in contrast to other "collision avoiding" routing methods. Unacceptable (corrupt) collisions (receiving different messages from multiple transmitters) are distinguished from acceptable collisions (receiving the same message from multiple transmitters). Unacceptable collisions may then be discarded, and acceptable collisions handled in a manner that avoids repeat transmissions.

An advantage of the invention is that it creates a tree-like topology and avoids loops associated with link-determined topologies. Routing is automatic; there is no need for routing tables. The computational cost at each device is low, and thus the invention may be inexpensively implemented.

DETAILED DESCRIPTION OF THE INVENTION

The following description is in terms of a wireless LAN (local area network) having radio frequency transmissions. However, the same concepts could be extended to any wireless network.

Figure 1:
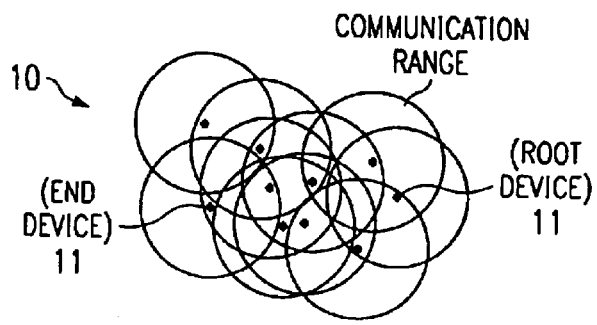
FIG. 1 illustrates a wireless network comprised of a number of wireless communications devices.

FIG. 1 illustrates a wireless LAN 10, comprised of a number of wireless communications devices 11. All devices 11 are equipped with a routing unit, discussed below in connection with FIG. 4, that implements the routing method described herein. This method may be generally characterized as link level routing. Any device 11 may be designated as a root device, with additional functionality for performing additional routing tasks, which may be consistent with known routing protocols above the link level.

Transmissions within network 10 are assumed to be RF (radio frequency) transmissions, or IR (infrared), and messages are transmitted as packets. Upon receiving a packet, each device 11 demodulates and decodes the packet and performs store and forward processing. The packet address is used to determine which device 11 is the destination for the packet.

An example of such a network 10 is a network in which devices 11 are personal computers, each equipped with a radio modem, in an office environment. However, devices 11 may be any device capable of sending and receiving wireless packet data, and are assumed to have "computation resources" that may interpret and respond to messages transported in the packets.

Network 10 is a multi-hop network, as indicated by the range of each device 11 being shorter than the maximum pairwise distance between devices. Thus, each packet typically undergoes multiple hops before reaching a destination device.

Figure 2:
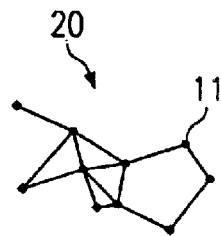
FIG. 2 illustrates a link-determined topology of the network of FIG. 1.

FIG. 2 illustrates a link-determined topology 20 of network 10. Unlike wired LANs, network 10 does not have a physical topology. Rather, links are set up for a particular transmission, and define a topology for that connection.

As discussed in the Background, in a link-determined topology, it is desirable to avoid loops. This is especially true when the communication range of the communicating devices is short relative to the maximum pairwise distance between devices. If messages are simply retransmitted from device to device, loops can cause messages to be cycled endlessly through the network, causing problems. The potential for loops exists in network 10, as illustrated by FIGS. 1 and 2.

In the past, to avoid loops and other problematic routing structures, routing tables and other computationally-intensive mechanisms have been used to create an effective star or star/tree topology from the link topology. The following description sets out an alternative method, which creates a tree-like topology, independent of the link-topology, with any device 11 designated as the root.

Figure 3:
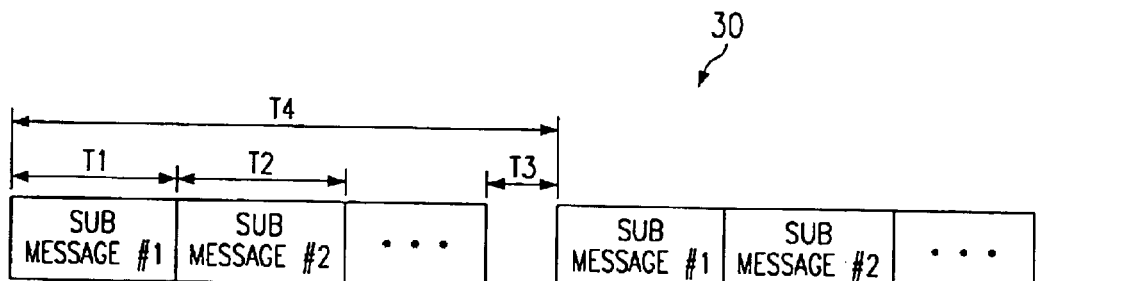
FIG. 3 illustrates the structure and timing of packets transmitted within the network of FIG. 1.

FIG. 3 illustrates the structure of a packet 30, which carries one or more messages to be communicated within network 10. Each packet 30 has a predetermined temporal duration, T4, and is comprised of a predetermined number of submessages. Each submessage has a predetermined temporal duration, T1, T2, . . . A predetermined interval, T3, between messages permits computational resources of a receiving device 11 to affect the content of the message, such as by adding content to a previously silent submessage.

The first submessage in a packet 30 is a control message, generated by the root device 11 of network 10. The control submessage contains the address of the destination device 11, as well as other control data, such as that used for error checking.

The other submessages in a packet 30 are assigned to non-root devices 11 as "slots" in a manner determined by the contents of the control submessage and the configuration of network 10. No more than one device 11 is assigned to a submessage slot at any given time.

Figure 4:
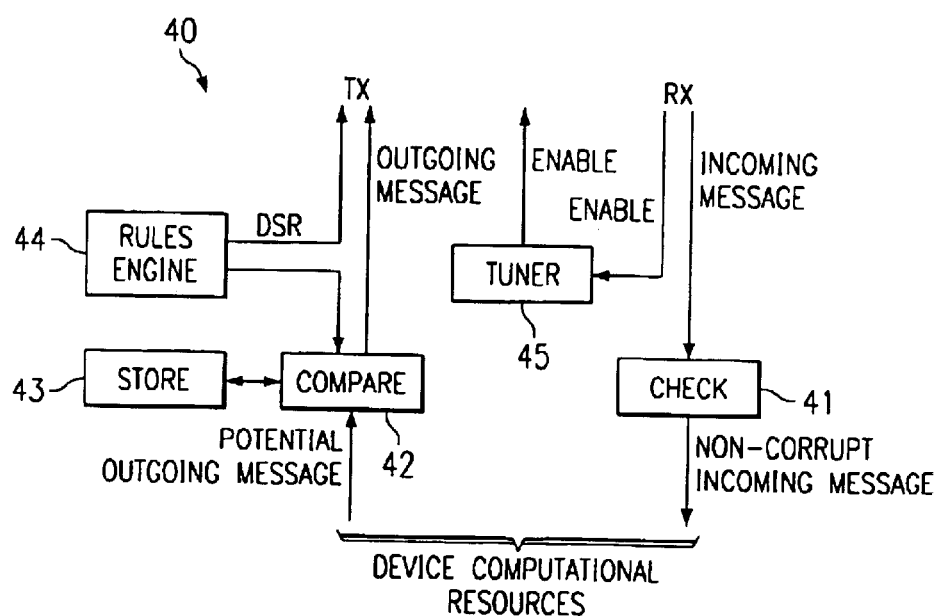
FIG. 4 illustrates the routing unit of each of the communications devices.

FIG. 4 illustrates a routing unit 40, implemented in each device 11. Routing unit 40 is comprised of a check process, a compare process, a message store, and a rules engine, each of which may be implemented with conventional computer programming techniques and hardware. Additionally, a timer 45 synchronizes transmission cycles. A receiver (RX) receives signals representing incoming packets, and as is inherent in wireless networks, may receive signals representing packets from more than one transmitter. This situation, where more than one transmitter is contending for the same receiver is referred to as "collision". Check process 41 checks the integrity of the message data. As explained below, if a receiving device's check process 41 determines the message data to be "corrupt", the receiving device 11 ignores the received data.

Non-corrupt messages are delivered to the computational resources of device 11, which determine whether the message is one to which device 11 may respond, and which may or may not add a response. The computational resources deliver a potential outgoing message (which is the same as the incoming message if no response is added) to compare process 42.

A message store unit 43 stores each last transmitted message, and is updated every transmission. For each potential outgoing message, message store unit 43 delivers the last transmitted message to the compare process 42. The compare process 42 compares the potential outgoing message to the previously transmitted message. A rules engine 44 uses the results of the comparison, and other conditions, to apply various rules that determine whether the message is to be transmitted.

Rules engine 44 can be summarized as storing and applying the following set of rules on behalf of its associated device 11.

Rule 1: Unless you are the root device, speak only when spoken to.

Rule 2: If you have just spoken, be quiet and listen.

Rule 3: If you have nothing to add, repeat exactly what you heard.

Rule 4: If you are about to repeat yourself, be quiet.

Rules engine 44 may be implemented as a state machine.

A timer 45 is triggered by each incoming message at the receiver (RX) and has a period of T4. At time T4, transmitter (TX) transmits the message out of device 11. Thus, as indicated in FIG. 4, timer 45 is enabled (triggered) by an incoming message to the receiver (R. After T4, a message may be transmitted by transmitter (TX) if (1) it has received an enable signal from timer. 45 (meaning that T4 has elapsed), and (2) it has received a dsr (data set ready) signal from rules engine 44 (meaning that there is a message to send). If device 11 has a suitable time base, timer 45 may be implemented with timing signals derived from device 11 external to routing unit 40.

The transmission of each message from device 11 is synchronized with that of other devices 11 in network 10.

Thus, all timers 45 begin and end their count of T4 at the same time. Re-synchronization occurs every other clock cycle (every time a message is received), and various known clock recovery techniques may be used to maintain synchronization in the interim. Furthermore, some inaccuracy is acceptable.

Because transmissions are synchronized, all transmitting devices 11 transmit their respective packets 30 at the same time. In accordance with Rule 2, each device 11 listens for a cycle after transmitting, and thus operates on alternating send-receive cycles, each having a period of T4. Expressed in common communications parlance, messages are allowed to "collide". However, routing unit 40 distinguishes acceptable (non-corrupt) from unacceptable (corrupt) collisions. More specifically, as stated above, at the receiving device, the check process 41 of the routing unit 40 checks each incoming transmission (which may be a combination of messages) for integrity.

When two transmitting devices 11 have transmitted to it at the same time, there are a number of possible scenarios. For purposes of simplicity, the non-control submessages in each packet 30 are collectively referred to as the "Message". At a given time, any two devices 11 may transmit one of the following: Message A, Message B, or Silence. Silence is an acceptable (non-corrupt) message. The following possibilities exist:

Message A+Message A=>Message A
Message B+Message B=>Message B
Message A+Silence =>Message A
Message B+Silence =>Message B
Silence+Silence =>Silence
Message A+Message B=>Corrupt Thus, in all but one case, the integrity of the combined message is preserved.

As explained in further detail below, in a given message, if any submessages are corrupt, the entire message is discarded, effectively deemed to be silence. Thus, for purposes of the invention, unless Message A and Message B are the same:

Message A+Message B=>Silence

As explained below, a corrupt message is discarded. The determination of whether subsequent transmissions are to occur to ensure that messages are eventually received at the intended destination is a matter to be resolved by the root device 11 and the particular protocol of network 10.

A first example of the operation of routing unit 40 is in the case of an incoming message that is Message A. After triggering timer 45, the message is checked for integrity by check process 41. Being non-corrupt, the message is passed to the computation resources of device 11. The resulting message is passed to compare unit 43. In accordance with Rule 4, if the message is not the same as the last transmitted message, it is passed to the transmitter, which is triggered by the expiration of timer 45.

As a second example, routing unit 40 receives Message A and Message B at the same time. Check process 41 determines the message to be corrupt and discards the message. Thus, the message is effectively a Silence message. In accordance with Rule 1, no message is transmitted.

As a third example, check process 41 might determine the incoming message to be non-corrupt, but compare process 42 might determine that an incoming message matches the previous transmission. In accordance with Rule 4, no message is transmitted.

FIGS. 5A–5G and FIGS. 6A–6G each illustrate how the invention operates so as to propagate multi-hop transmissions from a root node (or a node connected to the root node). Each set of figures illustrates the cycle-by-cycle propagation of messages. In accordance with Rule 1, each device other than the root device transmits only in response to receiving a message. In accordance with Rule 2, after transmitting a message, on the next T4 cycle, each device waits to receive a message rather than sending another message. Rules 3 and 4 are also illustrated as explained below.

FIGS. 5A–5G illustrate the operation of the invention in a network 50 having six devices 11. Only the compare process 42 of the routing unit 40 of each device 11 is illustrated. At each device 11, the state of the last message and the state of the current message are shown.

In this example, each device 11 is a "node" of the link-determined topology. The topmost device (Node 1) is the root device (or connected to the root). Node 4 is configured to respond to an incoming Control Message X with a Response Message Y. The computation resources of each device 11 are not shown, and communication with them is illustrated only for Nodes 1 and 4.

Figure 5A:
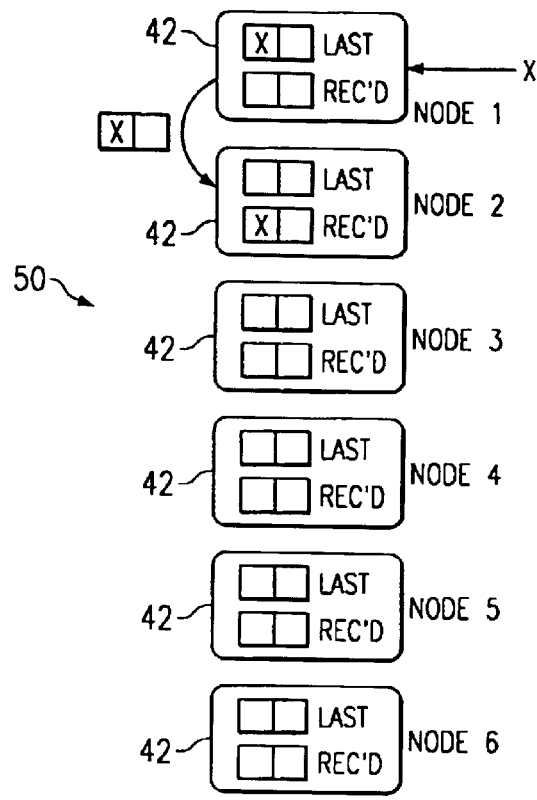
FIGS. 5A–5G illustrate the operation of the invention in a wireless network, such that the link-determined topology is a straight line.
Figure 5B:
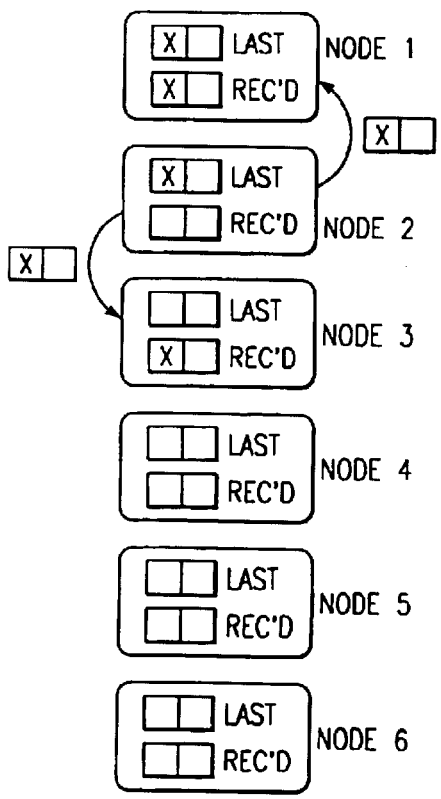

In FIG. 5A, Node 1 delivers Control Message X to Node 2. In FIG. 5B, in accordance with Rule 2, Node 2 has transmitted Control Message X, which is received at Nodes 1 and 3. At Node 1, its compare process 42 determines that the received message is the same as the last message, and its rules engine 44 applies Rule 4.

Figure 5C:
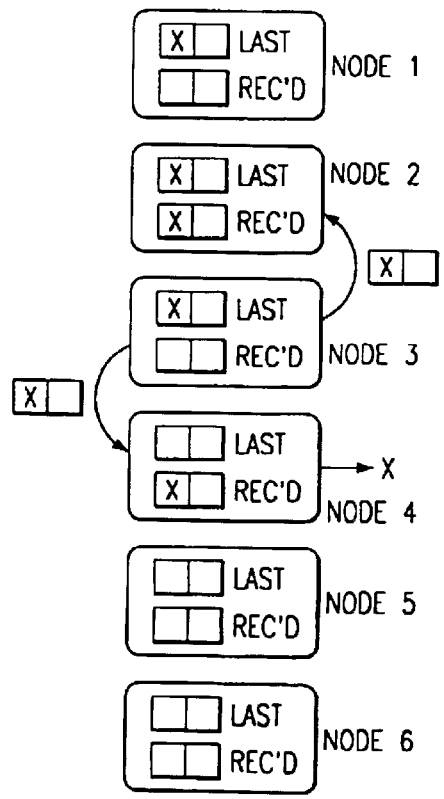
Figure 5D:
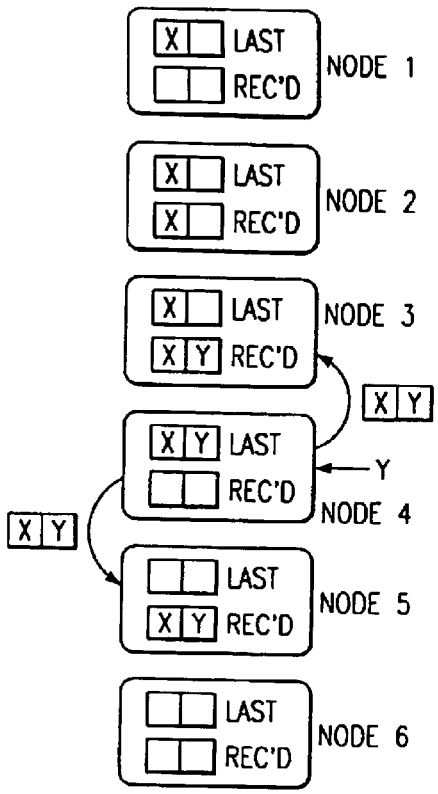

In FIG. 5C, Node 3 has transmitted Message X in accordance with Rule 3. The message from Node 3 is received at the Nodes 2 and 4. Node 2 applies Rule 4. Node 4, whose computation resources are configured to respond to Control Message X, delivers the message to its computational resources. In FIG. 5D, the computation resources of Node 4 have added Response Message Y, and Node 4 transmits Message XY to Nodes 3 and 5.

Figure 5E:
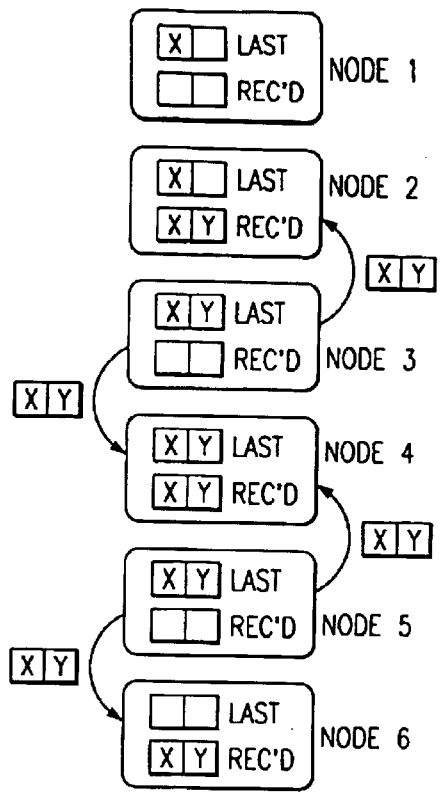
Figure 5F:
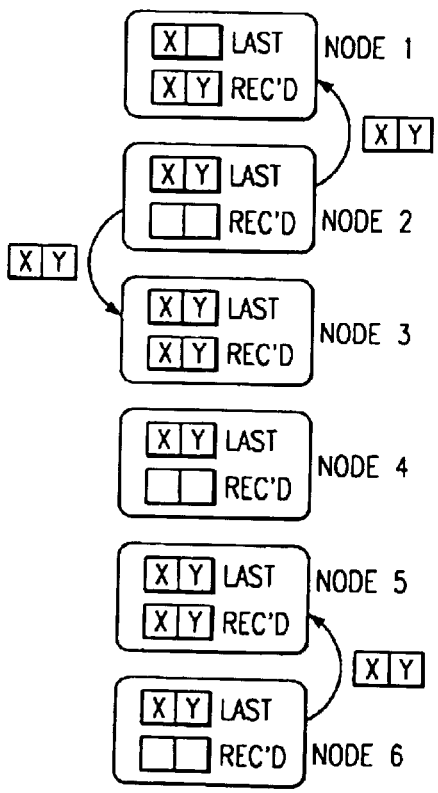
Figure 5G:
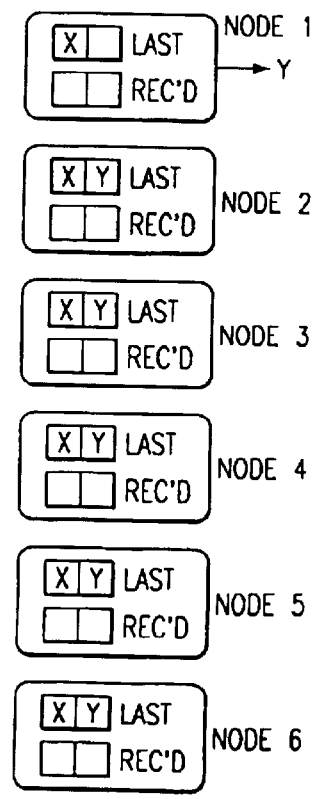

In FIG. 5E, Nodes 3 and 5 transmit Message XY to Nodes 2 and 4 and to Nodes 4 and 6, respectively. Node 4 applies Rule 4. In FIG. 5F, Nodes 2 and 6 transmit Message XY to Nodes 1 and 3 and to Node 5, respectively. Nodes 3 and 5 apply Rule 4. In FIG. 5G, Node 1 (the root node) transmits Message Y to another destination.

In FIGS. 5A–5G, the routing units 40 operate so as to create a tree-like topology that is a straight line. In other words, messages propagate unidirectionally because of Rule 3 (if nothing to add, repeat what you heard) and Rule 4 (don't repeat yourself).

FIGS. 6A–6G illustrate another network 60 having six nodes (devices 11). As in the case of FIGS. 5A–5G, only the compare process 43 is explicitly illustrated. The computation resources of Node 6 are assumed to be configured to respond to Message X.

Figure 6A:
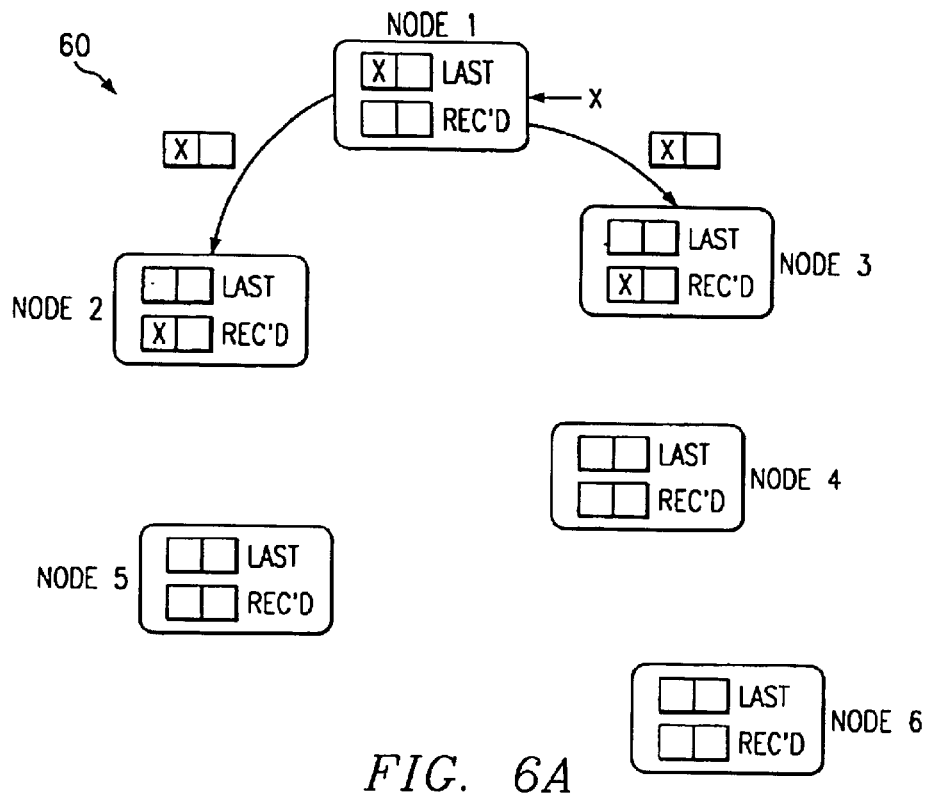
FIGS. 6A–6G illustrate the operation of the invention in a wireless network, such that the link-determined topology is a tree-like structure.
Figure 6B:
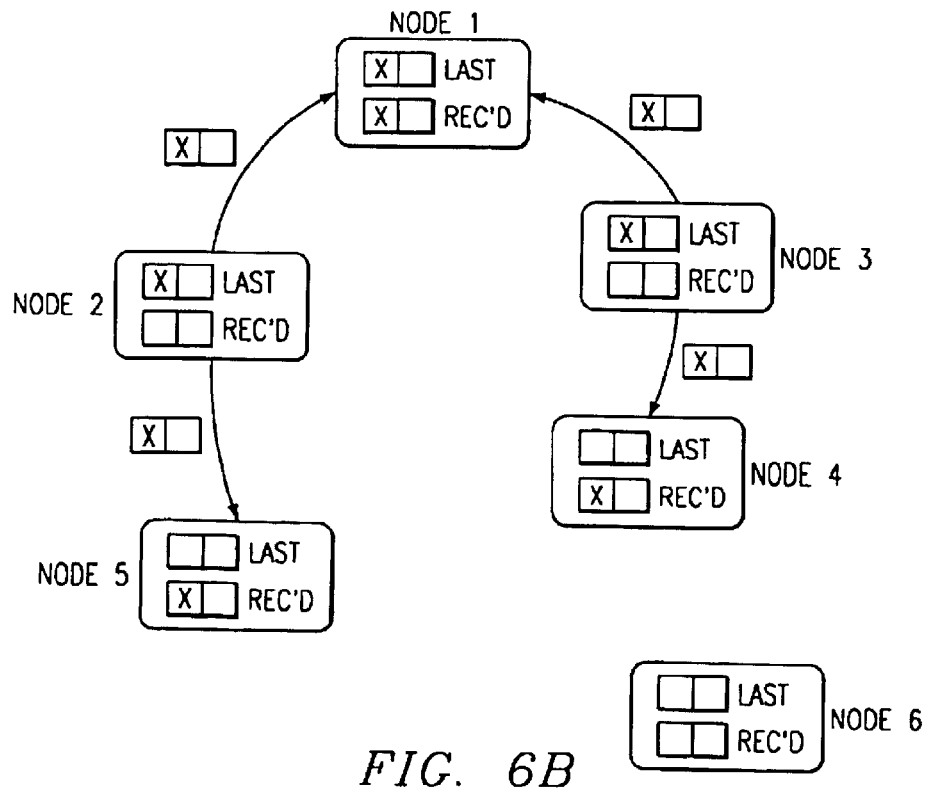

In FIG. 6A, Node 1 (the root node or a node connected to the root node) has transmitted Message X to Nodes 2 and 3. In FIG. 6B, in accordance with Rule 3, Nodes 2 and 3 have retransmitted to Nodes 1 and 5 and Nodes 1 and 4, respectively.

Figure 6C:
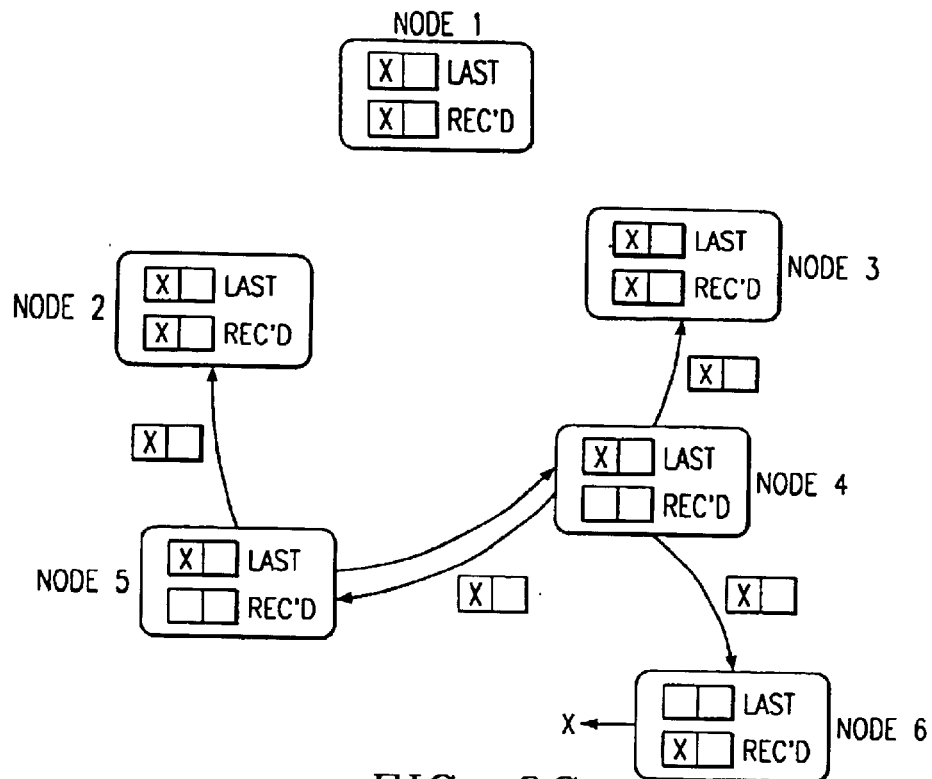

In FIG. 6C, Node 1 has applied Rule 4 and has not re-transmitted. Nodes 4 and 5 have retransmitted. The transmissions from Node 4 reach Nodes 3, 5, and 6. The transmissions from Node 5 reach Nodes 2 and 4.

Figure 6D:
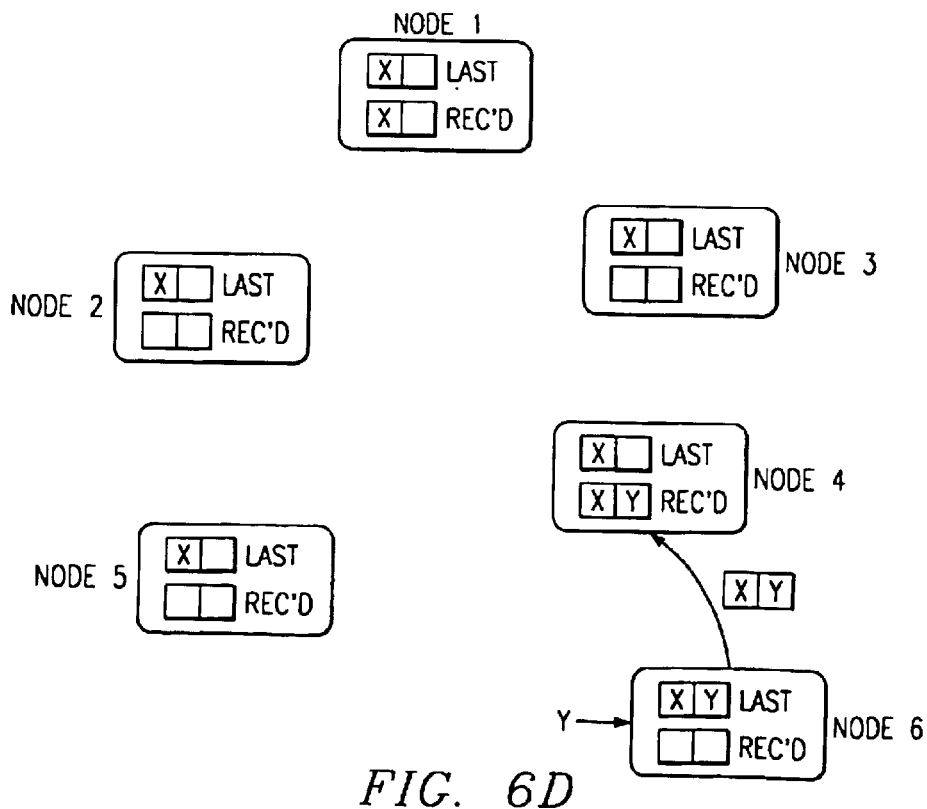

In FIG. 6D, all Nodes except Node 6 have applied Rule 4 and do not retransmit. The computation resources of Node 6 are configured to respond to Message X with by adding. Submessage Y, and it transmits Message XY in accordance with Rule 3. Its transmission reaches Node 4.

Figure 6E:
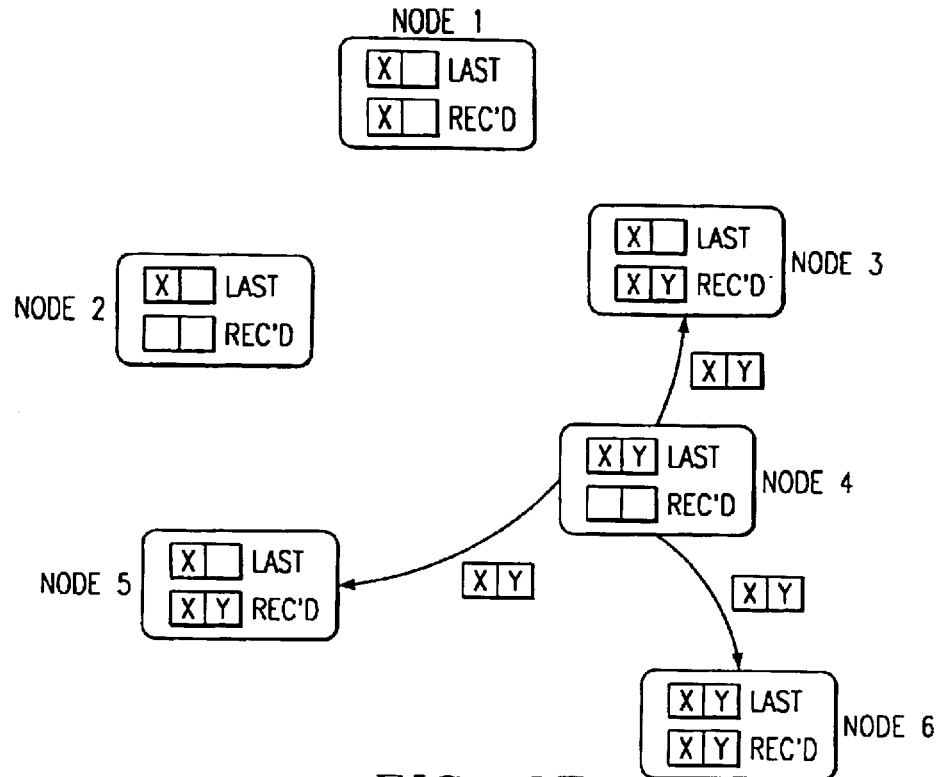
Figure 6F:
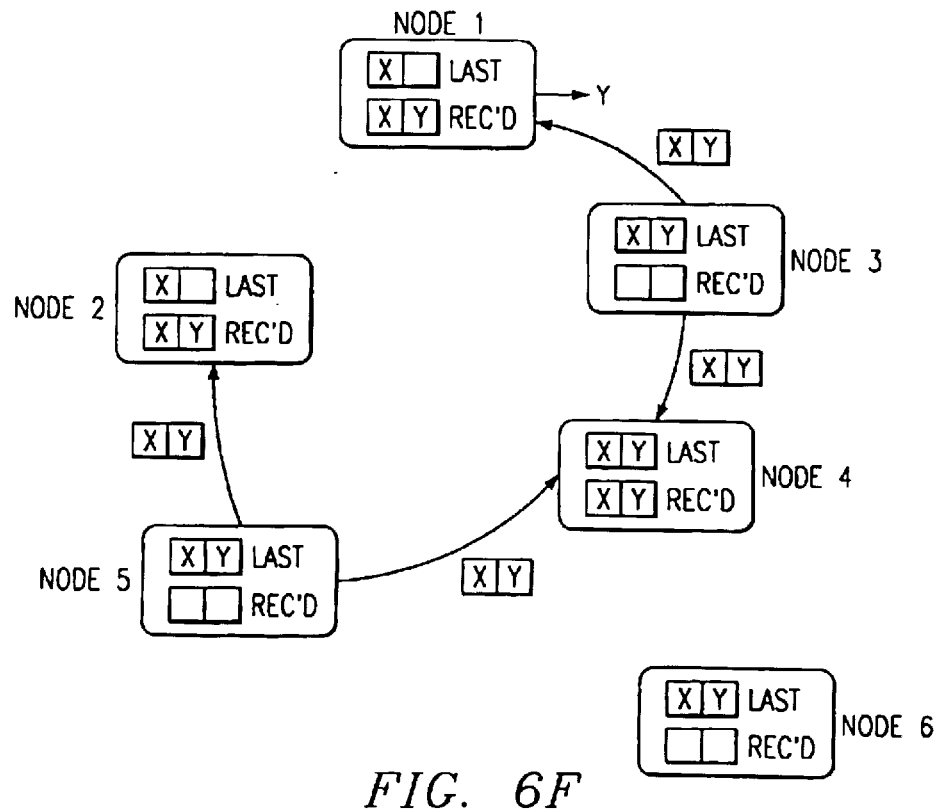
Figure 6G:
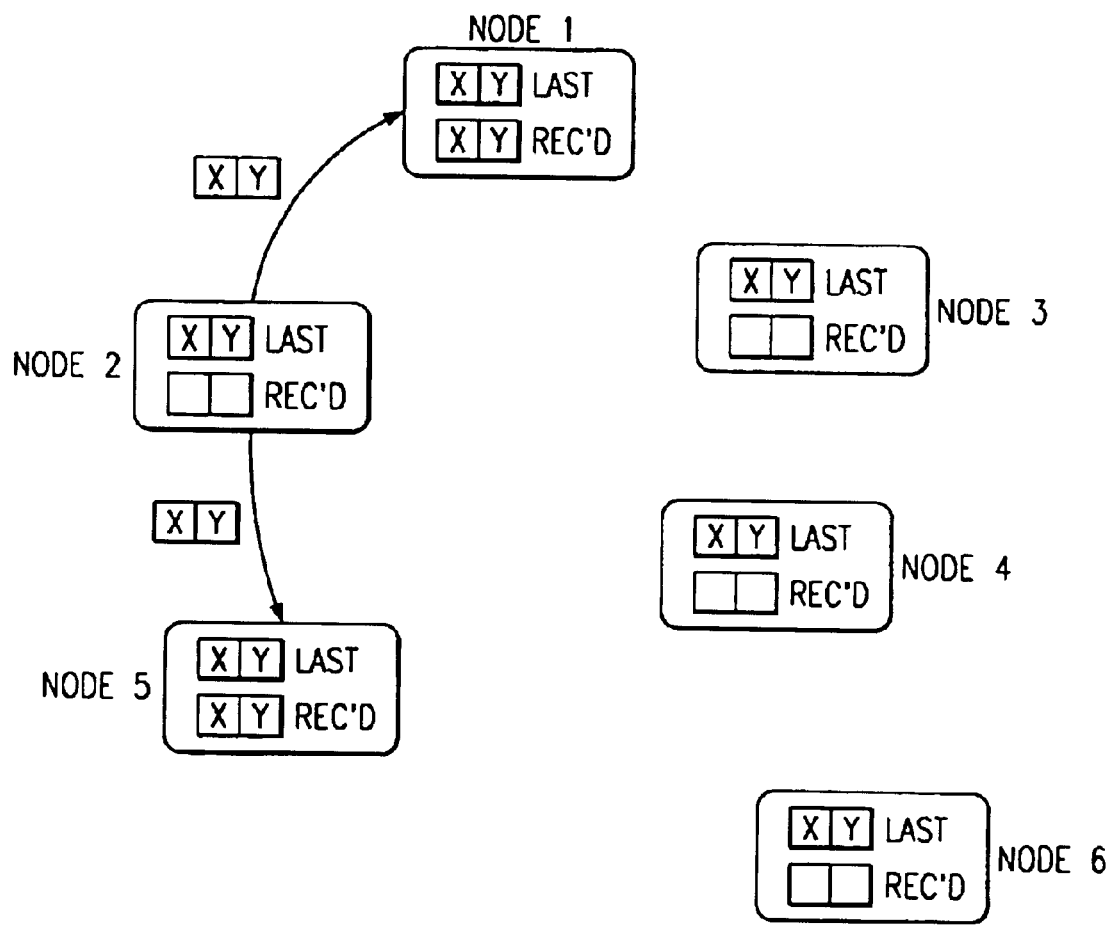

In FIG. 6E, Node 4 transmits Message XY, which reaches Nodes 3, 4, and 6. In FIG. 6F, Nodes 3 and 5 apply Rule 3 and transmit Message XY to Nodes 1 and 4 and Nodes 2 and 5, respectively. In FIG. 6G, Node 4 has applied Rule 4 and not retransmitted. Node 2 applies Rule 3 and transmits Message XY to Nodes 1 and 5.

In FIGS. 6A–6G, the link-determined topology is a tree like structure in which potential loops are avoided. As a result of the routing units 40 of each device 11 in network 60, messages and responses pass through loops; the loops do not cause messages to cycle endlessly. Multiple paths do not disrupt operation even if there are differing numbers of hops.

The method described above operates on the entire packet, at the message level. However, the method could be adapted to operate at the submessage level, in which case this description would be in terms of "submessages" rather than "messages". If any submessage in an incoming message did not pass the "integrity" test performed by check process 41, only that part of the submessage would be treated as silence. In other words:

Submessage A1+Submessage B1=>Silence

Submessages of the same message that were the same would continue through routing unit 40. In other words, Submessage A2+Submessage A2=>Submessage A2

Other Embodiments

Although the present invention has been described in detail it should be understood that various changes, substitutions, and alterations can be made hereto without departing from the spirit and scope of the invention as defined by the appended claims.

What is claimed is:

1. A method of routing messages in a wireless communications network having a number of wireless communications devices, comprising:
   synchronizing transmissions from each device, such that all transmissions occur simultaneously; and
   at each receiving device performing the following operations: storing each last transmitted message; checking incoming messages for integrity, such that any message comprised of different transmissions is designated as a corrupt message; discarding any corrupt messages; comparing each non-corrupt incoming message with the last transmitted message; using a rules engine to determine whether the incoming message should be transmitted as an outgoing message using the following rules:
   Rule 1: Unless you are the root device, speak only when spoken to;
   Rule 2: If you have just spoken, be quiet and listen;
   Rule 3: If you have nothing to add, repeat exactly what you heard; and
   Rule 4: If you are about to repeat yourself, be quiet.

2. The method of claim 1, wherein at least some of the devices have computational resources, and further comprising the steps of delivering the non-corrupt incoming message to the computational resources and receiving a potential outgoing message from the computational resources, wherein the comparing step further compares the potential outgoing message with the last transmitted message, and wherein the rules engine determines whether the potential outgoing message is to be transmitted.

3. The method of claim 1, wherein the rules engine applies a rule such that an outgoing message is transmitted only if the comparing step does not determine a match.

4. The method of claim 1, wherein the rules engine is implemented as a state machine.

5. A routing unit for a wireless communications device having at least a receiver, a transmitter, and computation resources, comprising:
   a timer for providing transmissions synchronized with transmissions of other devices;
   a check process programmed to determine the integrity of each incoming message and to deliver non-corrupt messages to the computation resources;
   a compare process programmed to receive potential outgoing messages from the computation resources and to compare each potential outgoing message with the last transmitted message; and
   a rules engine programmed to apply a set of rules that determine whether the potential outgoing message is to be transmitted from the device;
   wherein the rules engine is programmed such that it permits the device to transmit the potential outgoing message only in response to receiving a transmission of the last transmitted message.

6. The routing unit of claim 5, wherein the rules engine is programmed such that it requires the device to only receive after transmitting.

7. The routing unit of claim 5, wherein the rules engine is programmed such that it requires the device to repeat a received transmission unless the devices are computation resources configured to respond to the transmission.

8. The routing unit of claim 5, wherein the rules engine is programmed such that it prevents the device from repeating a transmission.

9. A method of routing messages in a wireless communications network having a number of wireless communications devices, at least some of the devices having computation resources, comprising:
   synchronizing transmissions from each device, such that all transmissions occur simultaneously; and
   at each receiving device performing the following operations: storing each last transmitted message; checking incoming messages for integrity, such that any message comprised of different transmissions is designated as a corrupt message; discarding any corrupt messages; delivering each non-corrupt incoming message to the computation resources; receiving a potential outgoing message from the computation resources, comparing each potential outgoing message with the last transmitted message; using a rules engine to determine whether the potential outgoing message should be transmitted;
   wherein the rules engine is programmed such that it requires the device to only receive incoming messages after transmitting the potential outgoing message.

10. The method of claim 9, wherein the potential outgoing message is the same as the incoming message.

11. The method of claim 9, wherein the rules engine is programmed such that it permits the device to transmit only in response to receiving a transmission.

12. The method of claim 1 wherein the rules engine is programmed such that it requires the device to repeat a received transmission unless the device is configured to respond to the transmission.

13. The method of claim 9, wherein the rules engine is programmed such that it uses the results of the comparing step to prevent the device from repeating a transmission.

14. A routing unit for a wireless communications device having at least a receiver, a transmitter, and computation resources, comprising:
   a timer for providing transmissions synchronized with transmissions of other devices;
   a check process programmed to determine the integrity of each incoming message and to deliver non-corrupt messages to the computation resources;
   a compare process programmed to receive potential outgoing messages from the computational resources and to compare each potential outgoing message with the last transmitted message; and
   a rules engine programmed to apply a set of rules that determine whether potential outgoing message is to be transmitted from the device;

wherein the rules engine is programmed to implement the following rules:

Rule 1: Unless you are the root device, speak only when spoken to;

Rule 2: If you have just spoken, be quiet and listen;

Rule 3: If you have nothing to add, repeat exactly what you heard; and

Rule 4: If you are about to repeat yourself, be quiet.

* * * * *